Patented Aug. 12, 1924.

1,504,339

UNITED STATES PATENT OFFICE.

WALTER GLAESER, OF BROOKLYN, NEW YORK.

MANUFACTURE OF MONOSODIUM PHOSPHATE.

No Drawing. Application filed April 12, 1922. Serial No. 551,916.

*To all whom it may concern:*

Be it known that I, WALTER GLAESER, a citizen of the United States, and a resident of Brooklyn, county of Kings, and State of New York, have invented a new and useful Improvement in the Manufacture of Mono-sodium Phosphate, of which the following is a specification, the principle of the invention being herein explained and the best mode in which I have contemplated applying that principle, so as to distinguish it from other inventions.

The present invention relates to a new and improved method of manufacturing mono-sodium phosphate from dicalcium phosphate as a raw material. To the accomplishment of the foregoing and related ends, the said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

In carrying out the present method, dicalcium phosphate is charged into a suitable wooden tank or other receptacle equipped with an agitating apparatus for stirring or agitating the solution. To this dicalcium phosphate I then add a sufficient amount of water to produce a thin mixture, after which sodium binoxalate is introduced and this may be either in a solid form or in solution in water. The mixture is then agitated and continued in agitation until the decomposition of the dicalcium phosphate is entirely completed which, under such conditions, is a fairly rapid reaction. The reaction may be carried out in the cold, although steam may be added, if desired, to hasten reaction, which may be represented as follows:

$$CaHPO_4 + NaHC_2O_4 = CaC_2O_4 + NaH_2PO_4$$

The calcium oxalate produced is insoluble and is removed by filtering and then washed with water until free from all soluble salts. The filtrate from the above filtration, together with the wash water used in washing the calcium oxalate which contain mono-sodium phosphate are then evaporated which permit the recovery of the mono-sodium phosphate in crystallized form, and as such it may either be changed to disodium phosphate by the addition of sodium carbonate solution or it may be used in a solid form as mono-sodium phosphate.

The present method presents a new and economical method or process for the manufacture of mono-sodium phosphate.

The calcium oxalate which is produced as a by-product in the above reaction may be treated with boiling sodium carbonate solution which causes the production of neutral sodium oxalate, according to the following equation:

$$CaC_2O_4 + Na_2CO_3 = CaCO_3 + Na_2C_2O_4$$

The sodium oxalate obtained in this manner may now be converted to bin-oxalate upon the addition of a suitable amount of an acid and may then be re-introduced into the process in this way reducing materially the cost of the reagent materials used in the manufacture of mono-sodium phosphate.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of manufacturing mono-sodium phosphate which consists in reacting upon dicalcium phosphate with sodium bin-oxalate in the presence of water while agitating the mixture, and then separating the mono-sodium phosphate formed from the calcium oxalate formed by filtration, and then evaporating the mono-sodium phosphate solution to solid form.

2. The method of making mono-sodium phosphate which consists in reacting upon dicalcium phosphate with sodium bin-oxalate and then removing the calcium oxalate formed from the resulting solution of mono-sodium phosphate, then reacting upon the calcium oxalate with boiling sodium carbonate to produce sodium oxalate, and then adding the required amount of an acid to produce sodium binoxalate for re-introduction into the process.

Signed by me, this 6th day of April, 1922.

WALTER GLAESER.